United States Patent [19]
Böhm et al.

[11] Patent Number: 5,735,457
[45] Date of Patent: Apr. 7, 1998

[54] RUBBER MIXTURE FOR AN ELASTIC INTERMEDIATE LAYER FOR A RAIL SUPPORT

[75] Inventors: Edgar Böhm, Gotha; Manfred Klerk, Hamburg; Karl-Heinz Krause, Chemnitz; Gerhard Merkmann, Gotha; Rolf Steinmüller, Gotha; Klaus Tübel, Gotha, all of Germany

[73] Assignee: Phoenix Aktiengesellschaft, Hamburg, Germany

[21] Appl. No.: 549,844

[22] PCT Filed: Feb. 15, 1995

[86] PCT No.: PCT/DE95/00186

§ 371 Date: Feb. 26, 1996

§ 102(e) Date: Feb. 26, 1996

[87] PCT Pub. No.: WO95/22659

PCT Pub. Date: Aug. 24, 1995

[30] Foreign Application Priority Data

Feb. 19, 1994 [DE] Germany .................. 44 05 294.4

[51] Int. Cl.[6] ...................................................... E01B 9/62
[52] U.S. Cl. ...................................................... 238/283
[58] Field of Search ............................ 238/283; 248/635

[56] References Cited

FOREIGN PATENT DOCUMENTS

| 387249 | 12/1988 | Austria . |
|---|---|---|
| 295685 | 12/1990 | European Pat. Off. . |
| 541884 | 5/1993 | European Pat. Off. . |
| 1355461 | 6/1964 | France . |
| 1380302 | 3/1965 | France . |
| 1014139 | 8/1957 | Germany . |
| 9101339.9 | 6/1991 | Germany . |
| 890942 | 3/1962 | United Kingdom . |
| 94 25675 | 11/1994 | WIPO . |

Primary Examiner—S. Joseph Morano
Attorney, Agent, or Firm—Collard & Roe, P.C.

[57] ABSTRACT

A rubber mixture is particularly based on natural rubber (NR), epoxidized natural rubber (E-NR), isoprene rubber (IR), butadiene rubber (BR), acrylate rubber (ACM), styrene-butadiene rubber (SBR), or blends of these types of rubber, particularly NR/SBR- blends or NR-BR- blends, as well as the usual mixing ingredients such as fillers, plasticizers, anti-aging media, as well as additional additives, if needed. This mixture produces a plate-like, elastic intermediate layer with low dynamic stiffening; high dynamic stressability; high specific volume resistivity; and low frequency-dependence of the dynamic stiffening. The intermediate layer is arranged particularly between the base of the rail and the top side of the tie in connection with high-speed rail tracks. The underside of the intermediate layer is provided with at least one recess, with formation of an edge extending all around, and facing the top side of the tie. The top side of the intermediate layer which is the surface supporting the base of the rail, is substantially planar shaped.

18 Claims, 5 Drawing Sheets

RUBBER MIXTURE FOR AN ELASTIC INTERMEDIATE LAYER FOR A RAIL SUPPORT

BACKGROUND OF THE INVENTION

The Prior Art

Elastic intermediate layers, which are arranged especially in connection with railway tracks between the base of the rail and the top side of the tie (e.g. concrete ties) are known (EP-B-0 295 685, FIG. 1; EP-A-0 541 884, FIG. 1). Such rail supports reduce the vertical rigidity of the track, increase the quietness of the rolling material, reduce the air sound level in the vehicles, and decrease the compression of the bedding.

Elastic rail supports have to be durable (at least 20 years) and stable, resistant to weathering and aging, resistant to water and have to have temperature stability (in the range of from −20° C. to +50° C.), as well as resistant to oil and grease.

Furthermore, as a result of the growing construction of high-speed tracks, rail supports are required to have:

Low dynamic stiffening (rigidity, hardening) in the low-frequency range (<50 Hz), in the medium frequency range (50 Hz to 400 Hz), and in the high-frequency range (>400 Hz to 2000 Hz);

high dynamic stressability;

a high specific volume resistivity of particularly $10^8$ ohm cm; and a low frequency dependence of the dynamic stiffening, whereby the German Federal Railway Authority has laid down desired values for a number of test criteria.

SUMMARY OF THE INVENTION

The problem resulting from the high requirements is solved by the use of a rubber mixture, particularly natural rubber (NB), epoxidized natural rubber (E-NR), isoprene rubber (IR), butadiene rubber (BR), acrylate rubber (ACM), styrene-butadiene rubber (SBR), or blends of these types of rubber, especially NR/SBR- or NR/BR-blends, as well as the usual mixing ingredients such as fillers, plasticizers, anti-ageing media, and other additives, if need be:

This rubber mixture is combined with the constructional design of the plate-like, elastic intermediate layer, particularly the rail support described above, whereby the underside of the intermediate layer is provided with at least one recess forming an edge extending all around, said underside facing the top side of the tie, whereas the top side of the intermediate layer, i.e., the surface supporting the base of the rail, is designed substantially planar.

Usefully, the rubber mixture contains a rubber component of from 45 to 75% by weight, particularly of from 55 to 65% by weight.

Useful constructional design variations are also disclosed, whereby said design features are discussed in detail within the framework of the description of the figures.

A mixing formula (table 1) with test results (table 2) is specified hereinafter within the experimental part following now, whereby the following symbols are applicable with respect to the test criteria:

| | |
|---|---|
| Static axial stiffening | $C_{stat}$ |
| Dynamic axial stiffening | $C_{dyn}$ |
| Static depression | $f_{stat}$ |
| Dynamic depression | $f_{dyn}$ |
| Dynamic stiffening factor | æ |

The test specimen was a profiled plate with the following dimensions:

| | |
|---|---|
| Rectangular shape of the plate | 145 mm × 160 mm |
| Thickness of the plate | 7 mm |
| Edge width | 12 mm |
| Number of burls with a rectangular shape viewed from the top | 20 (4 × 5) |
| Depth of the latticed recess | 4 mm |
| Number of venting joints | 2 |

TABLE 1

| Mixture Components | Quantity [% by weight] |
|---|---|
| NR | 40.0 |
| SBR | 20.0 |
| Soot N 550 | 25.0 |
| Aromatic plasticizer | 8.0 |
| Stearic acid | 1.6 |
| Dihydroquinoline derivative[i] | 0.3 |
| p-phenylene-diamine derivative[ii] | 0.5 |
| Sulfenamide accelerator[iii] | 0.7 |
| Zinc oxide | 2.4 |
| Sulphur | 1.5 |
| | 100.0 |

[i]Example: TMQ
[ii]Example: IPPD
[iii]Example: CBS

TABLE 2

| Test Criterion | Measured values | Desired values |
|---|---|---|
| $C_{stat}$ [KN/mm] | 64 | 60 ± 10 |
| $C_{dyn}$ [KN/mm] at 30 Hz/RT as well as at 5 s/10 s/20 s | 90/92/93 | 100 ± 50 |
| $f_{stat}$ [mm] at 68 KN | 1.6 | ≦1.7 |
| $f_{dyn}$ [mm] at 30 Hz as well as at 5 s/10 s/20 s | 1.55 | ≦1.6 |
| æ[i] | 1.41/1.44/1.45 | ≦1.8 |
| at 5 s/10 s/20 s | | |
| $\Delta C_{dyn}$ [KN/mm][ii] | 3 | — |
| [iii] | 2.9 | ≦3 |

[i] $æ = \dfrac{C_{dyn}}{C_{stat}}$

[ii] $\Delta C_{dyn} = C_{dyn\ (20\ s)} - C_{dyn\ (5\ s)}$

[iii]horizontal rubber bulging in mm under static load and dynamic load

BRIEF DESCRIPTION OF THE DRAWINGS

The invention is explained using the following exemplified embodiments by reference to schematic drawings, in which.

DETAILED DESCRIPTION OF PREFERRED EMBODIMENT

Figure 1:
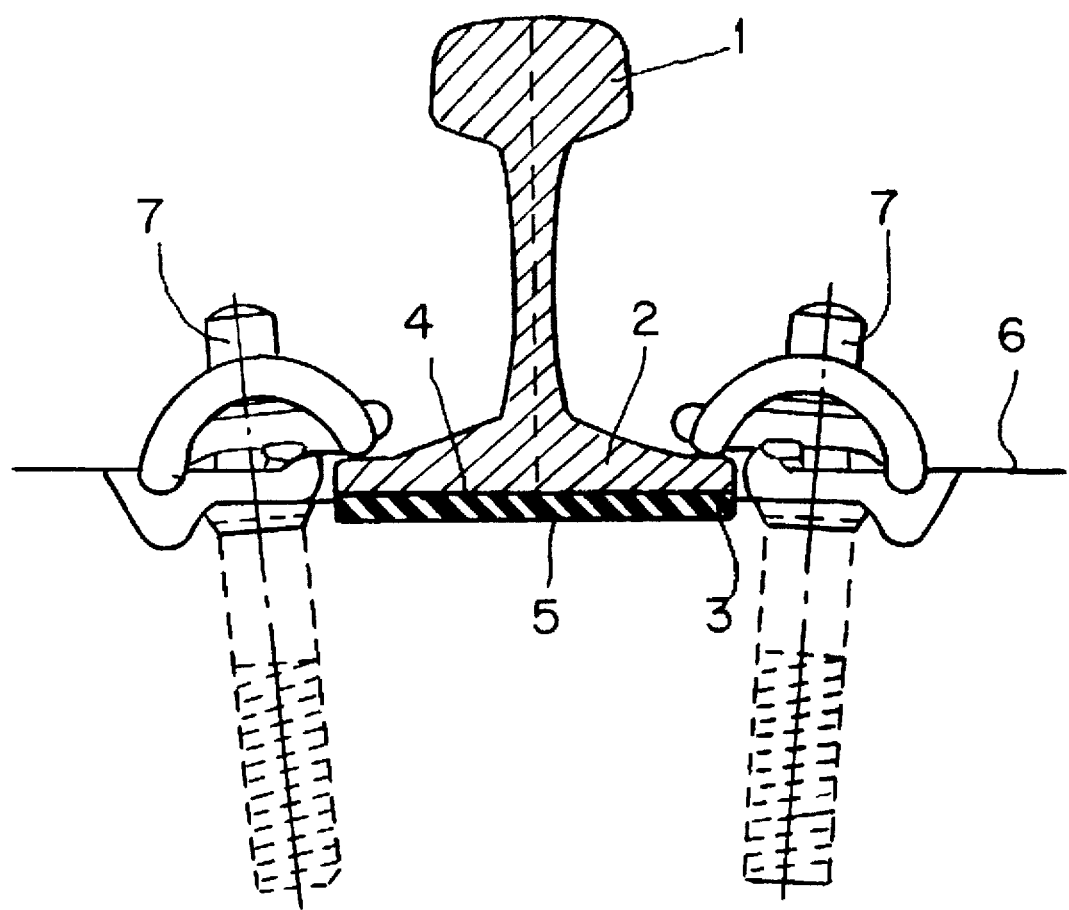
FIG. 1 shows a rail arrangement with an elastic intermediate layer (cross sectional representation)

According to FIG. 1, the rail arrangement is comprised of the following parts:

A Rail 1, supported on an rail base 2, and an Elastic intermediate layer (rail support) 3.

A Top side of intermediate layer 4 supports the base of the rail, and an underside of the intermediate layer 5 is supported on a top side of the tie (e.g. concrete tie) 6.

A Fastening system 7 connects the components.

Figure 2:
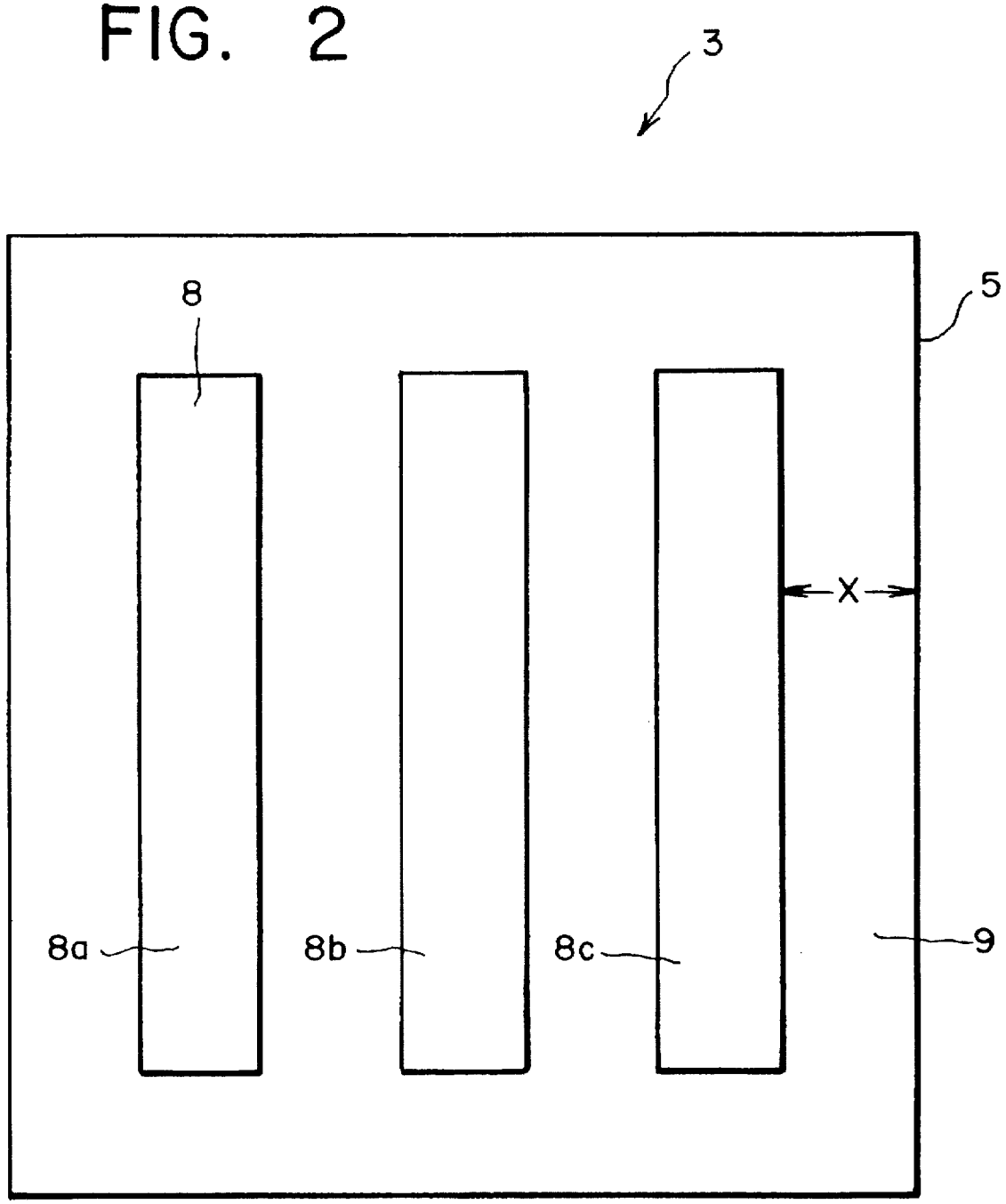
FIGS. 2, 3, 4 show three exemplified embodiments of the underside of the intermediate layer with different recess variations (top view)

FIG. 2 shows the underside (5) of an elastic intermediate layer (3), in connection with which the entire recess (8) is a system of three joints (8a, 8b, 8c) extending parallel with each other, said joints being arranged separated from one another.

These joints may, in this connection, extend in the longitudinal direction of the rail or in the transverse direction of the rail. The plate edge (9), which extends all around, usefully has a minimum width X of 5 mm.

Figure 3:
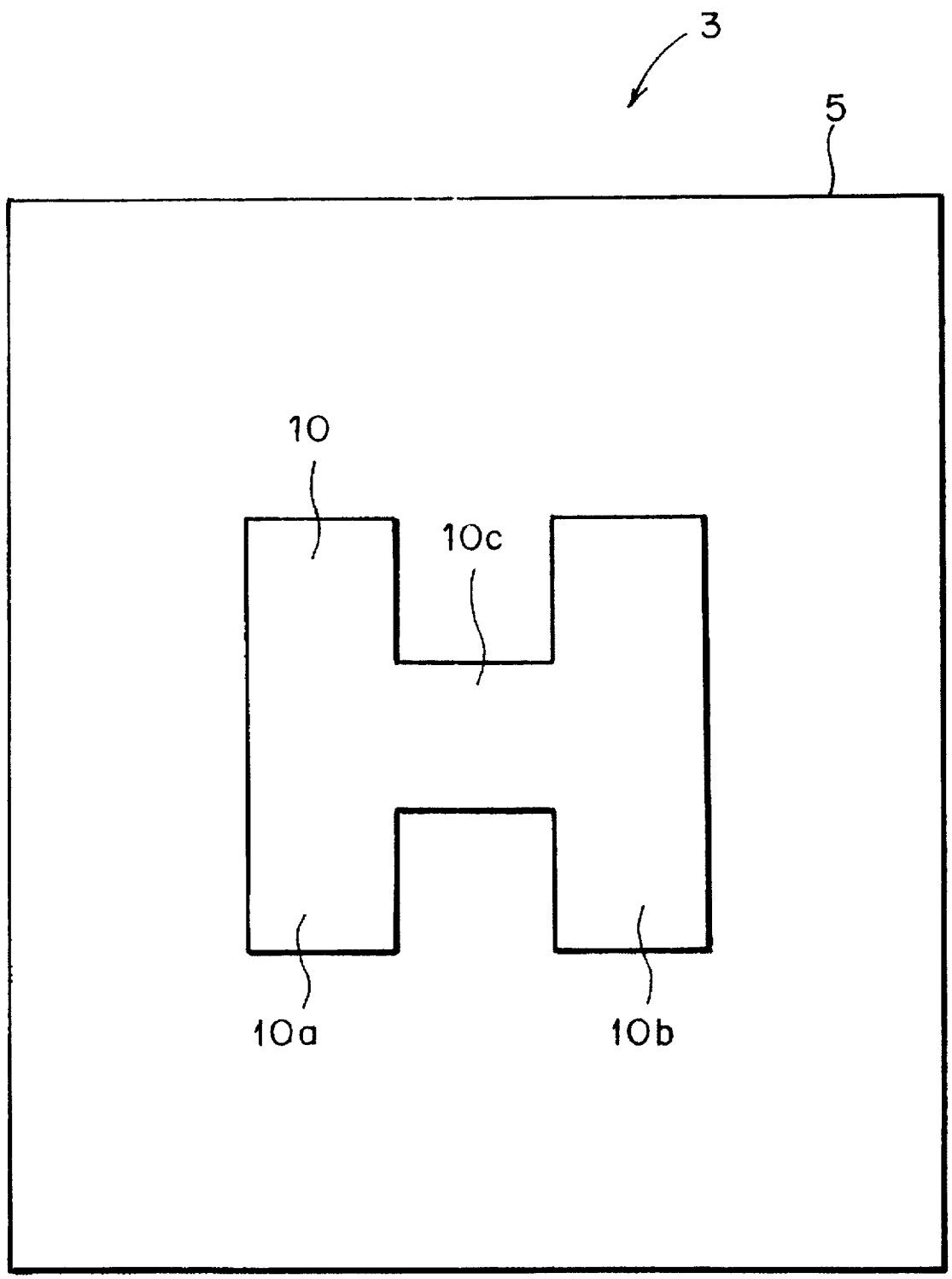

According to FIG. 3, the underside (5) of the elastic intermediate layer (3) is provided with a recess (10), which is formed by the two parallel extending joints (10a, 10b) and a cross joint (10c) which is H-shaped when viewed from the top.

Figure 4:
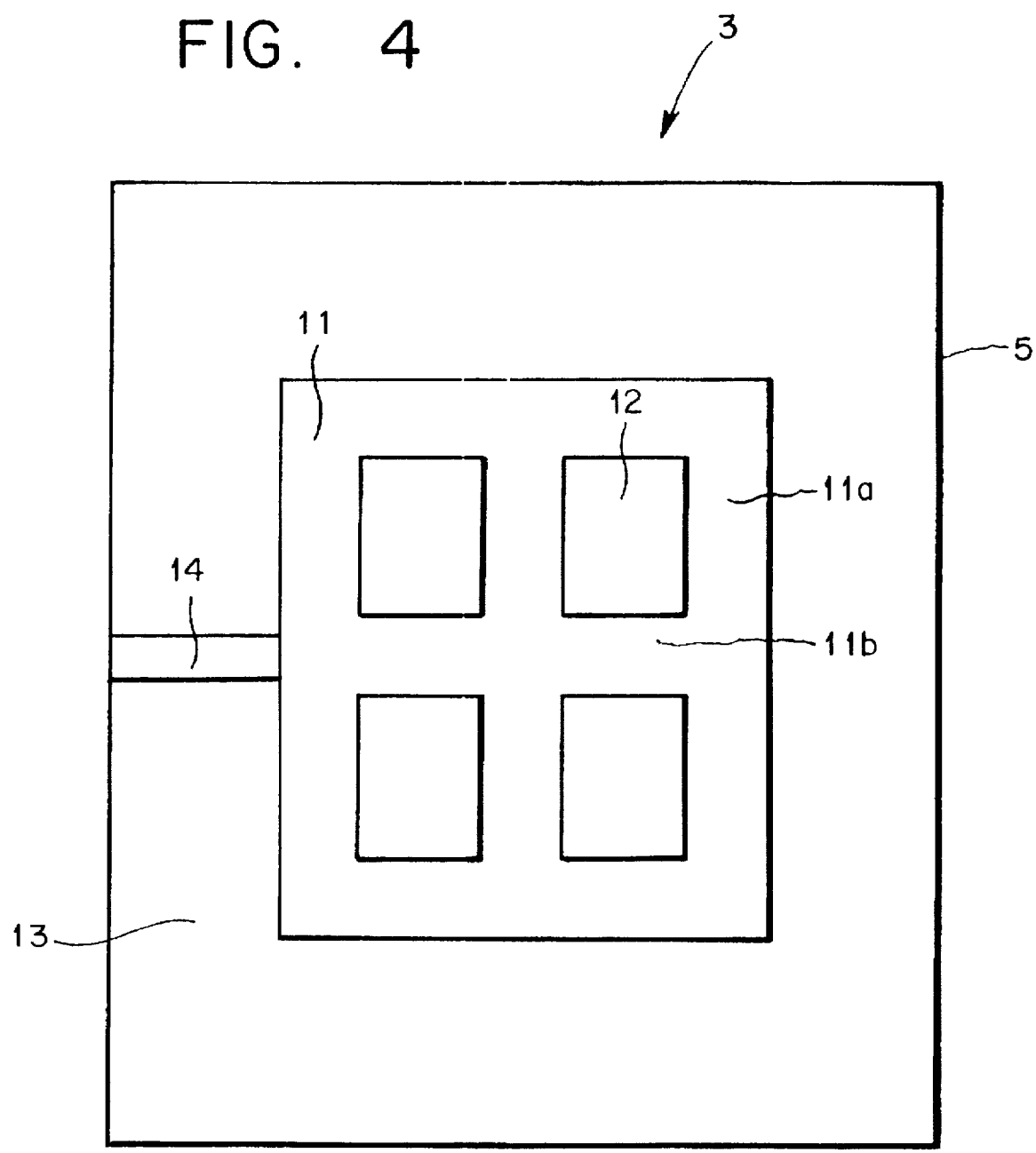

FIG. 4 shows another variation of the underside (5) of an elastic intermediate layer (3), in connection with which the entire recess (11) is a lattice system of joints (11a, 11b), with the formation of four hurls (12) which, in this case, have a rectangular shape when viewed from the top.

With a number of burls n>4, it is advantageous if the burls in the corner zone of the elastic intermediate layer have a larger surface than those located in the center area.

This basic principle has been realized also with the test specimen with a total of 20 burls.

The edge (13), which extends all around, is provided here with a venting joint (14).

Figure 5:
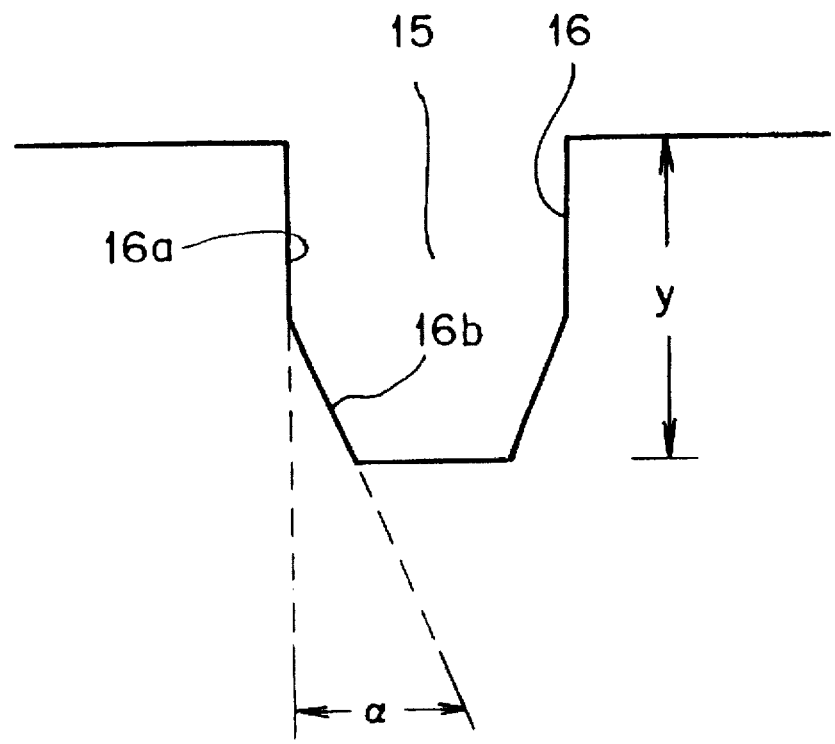
FIG. 5 shows the side wall of a recess (cross-sectional representation)

FIG. 5 shows the cross section of a recess (15), the side wall (16) of which extends vertically in the upper part (16a), and at an angle in the lower part (16b), whereby the angle α usefully amounts to 45° to 60°. The minimum depth Y of the recess amounts to 3 mm.

Figure 6:
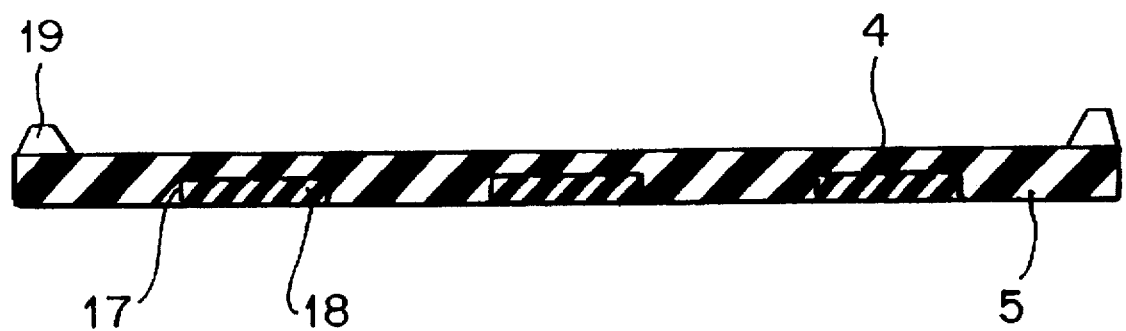
FIG. 6 shows an elastic intermediate layer, in connection with which the entire recess is filled, and where the top side is fitted with edge strips (cross-sectional representation).

FIG. 6 shows a special variation of an elastic intermediate layer (3). In this case, the entire recess (17) is filled (i.e., foamed) with a soft elastic material (18) with very low water absorption, particularly with cellular rubber. In addition, the top side (4) is fitted with the edge strips (19), the latter extending in the longitudinal direction of the rail.

The recess of the elastic intermediate layer 13) can be formed later by cutting a plate (e.g. laser cutting; water jet cutting). Furthermore, a correspondingly shaped article can be manufactured by means of the CM-, IM- or ITM-process.

Even though the application of the elastic intermediate layer according to the invention is focused on the sector of rail bedding, the profiled plate can be used for supporting highly stressed machines as well. In that case, the concrete tie would be a concrete foundation, and the base of a machine would replace the base of the rail. Furthermore, in such a case, the profiled underside would rest on the foundation, whereas the substantially plane top side would form the surface supporting the base of the machine.

We claim:

1. Elastic intermediate layer with a low dynamic stiffening, a high dynamic load-carrying ability, a high specific volume resistance, and a low frequency-dependence of the dynamic stiffening, and said intermediate layer comprising a rubber mixture selected from the group consisting of natural rubber (NR), epoxidized natural rubber (E-NR), isoprene rubber (IR), butadiene rubber (BR), acrylate rubber (ACM), styrene-butadiene rubber (SBR), and the mixtures thereof, said rubber mixture containing mixing ingredients selected from the group consisting of fillers, plasticizers, and anti-aging agents, said rubber mixture containing an amount of rubber ranging from 45% to 75% by weight based upon the total weight of said mixture; and said elastic intermediate layer being formed into a plate and positioned between a rail base and a tie top side of a high-speed rail track, a top side of said elastic intermediate layer, which is a surface supporting the rail base, being formed planar, while an underside of the intermediate layer facing the tie top side, has a surrounding edge, and which surrounding edge extends all around the rail base and has a minimum width X of 5 mm, said edge has at least one venting joint, said elastic intermediate layer is provided with at least one entire recess having a minimum depth Y of 3 mm, the side wall of said at least one recess in upper part extending vertically and in lower part extending at an angle α being 45° to 60°.

2. Elastic intermediate layer according to claim 1, wherein said layer contains an amount of rubber ranging from 55% to 65% by weight, based upon the total weight of said mixture.

3. Elastic intermediate layer according to claim 1, wherein the entire recess comprises a system of three parallel extending joints which are arranged separately from each other.

4. Elastic intermediate layer according to claim 1, wherein the entire recess comprises a system of two parallel extending joints which are connected to each other by means of a cross joint, forming an H-like configuration when viewed from above.

5. Elastic intermediate layer according to claim 1, wherein the entire recess comprises a lattice system of joints, forming four burls.

6. Elastic intermediate layer according to claim 1, wherein the entire recess comprises a lattice system of joints, forming more than four burls, the burls in the corner area of the elastic intermediate layer having a larger surface than the burls in the center area.

7. Elastic intermediate layer according to claim 1, wherein the entire recess remains unfilled.

8. Elastic intermediate layer according to claim 1, wherein the entire recess is filled with a soft, elastic material with very low water absorption.

9. Elastic intermediate layer according to claim 1, wherein the top side of the intermediate layer is provided with edge strips extending in a longitudinal direction of the rails.

10. The combination of a high speed rail track having a rail base and a tie with a top side and an elastic intermediate layer with a low dynamic stiffening, a high dynamic load-carrying ability, a high specific volume resistance, and a low frequency-dependence of the dynamic stiffening, and said intermediate layer comprising a rubber mixture selected from the group consisting of natural rubber (NR), epoxidized natural rubber (E-NR), isoprene rubber (IR), butadiene rubber (BR), acrylate rubber (ACM), styrene-butadiene rubber (SBR), and the mixtures thereof, said rubber mixture containing mixing ingredients selected from the group consisting of fillers, plasticizers, and anti-aging agents, said rubber mixture containing an amount of rubber ranging from 45% to 75% by weight based upon the total weight of said mixture; and said elastic intermediate layer being formed into a plate and positioned between said rail base and said tie top side of said high-speed rail track, a top side of said elastic intermediate layer, which is a surface supporting the rail base, being formed planar, while an underside of the intermediate layer facing the tie top side, has a surrounding edge, and which surrounding edge extends all around the rail base and has a minimum width X of 5 mm, said edge has at least one venting joint, said elastic intermediate layer is provided with at least one entire recess having a minimum depth Y of 3 mm, the side wall of said at least one recess in upper part extending vertically and in lower part extending at an angle α being 45° to 60°.

11. The combination according to claim 10, wherein said layer contains an amount of rubber ranging from 55% to 65% by weight, based upon the total weight of said mixture.

12. The combination according to claim 10, wherein the entire recess comprises a system of three parallel extending joints which are arranged separately from each other.

13. The combination according to claim 10, wherein the entire recess comprises a system of two parallel extending joints which are connected to each other by means of a cross joint, forming an H-like configuration when viewed from above.

14. The combination according to claim 10, wherein the entire recess comprises a lattice system of joints, forming four burls.

15. The combination according to claim 10, wherein the entire recess comprises a lattice system of joints, forming more than four burls, the burls in the corner area of the elastic intermediate layer having a larger surface than the burls in the center area.

16. The combination according to claim 10, wherein the entire recess remains unfilled.

17. The combination according to claim 10, wherein the entire recess is filled with a soft, elastic material with very low water absorption.

18. The combination according to claim 10, wherein the top side of the intermediate layer is provided with edge strips extending in a longitudinal direction of the rails.

* * * * *